S. M. HOWELL.

METALLURGICAL FURNACE.

APPLICATION FILED JUNE 5, 1920.

Reissued July 13, 1920. 14,914.

Witnesses,
C. L. Hayden,
G. A. Elliott,
By S. M. Howell, atty.

Inventor
Samuel M. Howell.

UNITED STATES PATENT OFFICE.

SAMUEL M. HOWELL, OF ZANESVILLE, OHIO.

METALLURGICAL FURNACE.

14,914. Specification of Reissued Letters Patent. Reissued July 13, 1920.

Original No. 1,337,703, dated April 20, 1920, Serial No. 308,026, filed July 1, 1919. Application for reissue filed June 5, 1920. Serial No. 387,790.

*To all whom it may concern:*

Be it known that I, SAMUEL M. HOWELL, a citizen of the United States, residing at Zanesville, in the county of Muskingum and State of Ohio, have invented certain new and useful Improvements in Metallurgical Furnaces, of which the following is a specification.

My invention relates to furnaces and arrangements used for heating in metallurgical and other operations in which the combustible is usually hydrocarbon gas or vapor mixed with air, and has for its principal objects to provide a furnace in which the temperature or rate of combustion may be moderated at will by reducing the rate of air and gas admission without back firing, or without regard to the so called rate of back firing or the rate of flame propagation in the gaseous mixture employed, and to mix the combustible gases intimately and thoroughly before combustion begins and to use in such construction materials which are cheap and easily available.

These improvements are illustrated in the accompanying drawing, in which—

Figure 1:
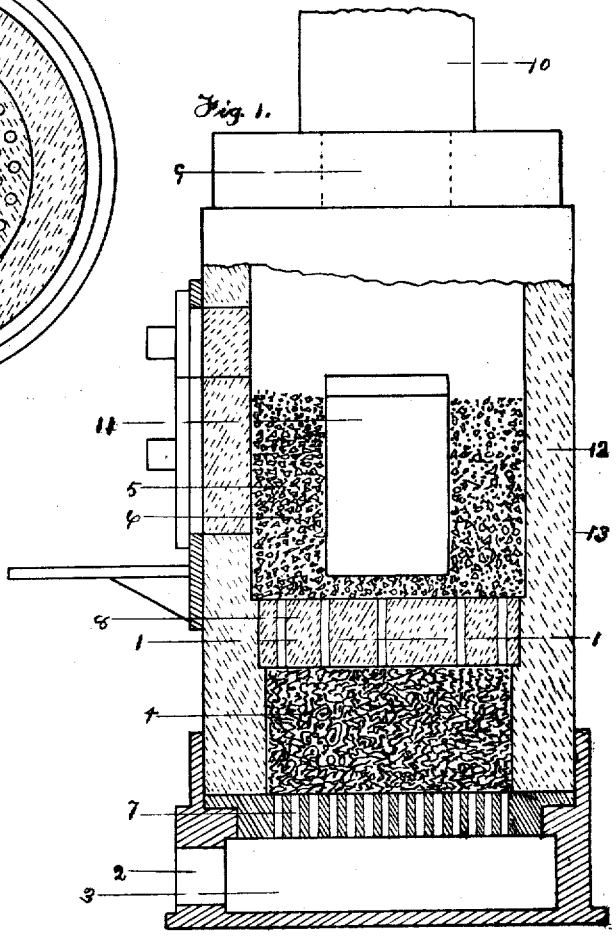

Figure 1 is a view principally in vertical section of a crucible furnace constructed upon the lines of my invention, and Fig. 2 is a transverse section of the same on line 1—1, Fig. 1.

Like numerals refer to like parts in each view.

Thus 2 is the inlet passage for air and gas, 3 the receiving chamber, 4 the mixing chamber, containing a body of metallic chips, that is, small pieces or shavings of metal such as iron or steel machine chips, turnings or borings. This body need not be especially refractory or fireproof, since as will hereinafter more fully appear, it becomes only slightly heated while in use, but it should be of such a nature that the heat received may be quickly absorbed and dissipated; it should be capable of containing a moderate quantity of heat without an undue use of temperature. Fire clay, magnesite, and other refractories of same character are entirely unsuitable for the reason that their specific capacity for heat is far too low. I have used granulated zinc for this purpose, but partly for economic reasons the machine chips named above are preferred. These chips should be moderately rammed or compacted into the mixing chamber; thus forming a body of considerable thickness or volume but one that is freely porous. 5 is the combustion chamber, and 6 the fire bed composed of a heap or pile of coarsely granulated refractory material, loosely collected and adapted to permit the passage of flame and to allow the combustion of air and gas to take place within it, or within the voids and interstices between the particles and lumps of which the body is made up. This material should be not only refractory to a high degree but should also be porous and practically non combustible. Crushed fire brick will answer in brass foundry practice but for higher temperatures the superrefractories such as magnesite are required. 7 is the lower retaining plate, and 8 the upper retaining plate. These plates hold the before described body of metallic chips in place within the mixing chamber and support the fire bed while they freely permit the passage of air and gas, and the upper plate has also a further use as will presently appear. The lower plate may be conveniently made of cast iron in the form of a rather fine grating. The upper plate is however of a non metallic and refractory material, such as fire clay or the like, in order to resist the intense heat of the fire bed and to protect the aforesaid contents of the mixing chamber from the same. To allow the passage of air and gas this plate is thickly perforated with small holes, and will hereinafter be referred to as a refractory upper retaining plate. 9 is an opening for the escape of the products of combustion, 10 the stack or chimney, 11 the crucible, 12 the lining and 13 the casing.

In the operation of the furnace the air and gas forced by pressure or drawn by the natural draft of the chimney enter the receiving chamber by way of the inlet passage, and passing through the lower retaining plate and the mixing chamber and upper retaining plate are thereby very thoroughly mixed and commingled before combustion begins, and the mixture thus formed burns rapidly within the combustion chamber. The fire bed by reason of the already well known effect of surface combustion acts to prevent or retard dissociation of the elements of the gaseous mixture, and to accelerate and intensify combustion and to localize and collect the heat, and thus produce a very high temperature; as high in some cases as 2000° centigrade. When a reduced rate of combustion or a lower temperature is desired the same may at once be secured by reducing the rate of air and gas admission; the furnace continuing to operate steadily without back firing. Minute flames or sparks may at times flit back through the small holes in the upper retaining plate but they are instantly extinguished upon reaching the said body of metallic chips, but these flames or sparks are not sufficient in volume to heat the body of chips to any serious or notable extent. Thus while either of these elements, that is either the refractory upper retaining plate or the body of chips, if used alone would in a furnace of this character be wholly inadequate, they are when used conjointly entirely successful.

I am aware that certain devices such as wire cloth, metal tubes, &c., for the prevention of back firing in gaseous mixtures have long been known, and that some improvements such as the use of mineral wool, asbestos, and other materials have been made therein, and that bodies of various materials have been used as gas and air mixers, and that gas furnaces in which the principle of surface or flameless combustion is applied are known and used, but these differ from my arrangements and are not herein broadly claimed.

I claim,

1. In a metallurgical furnace using air and gas or a hydrocarbon vapor as fuel, the combination of a mixing chamber containing a body of metallic chips with a refractory upper retaining plate substantially as set forth and described.

2. In a metallurgical furnace using air and gas or a hydrocarbon vapor as fuel, the combination of a mixing chamber containing a body of metallic chips with a casing, an inlet passage, a receiving chamber, a lower retaining plate, a refractory upper retaining plate, a combustion chamber, and a fire bed substantially as set forth and described.

SAMUEL M. HOWELL.

Witnesses:

C. L. HAYDON,

G. A. ELLIOTT.

Correction in Letters Patent Reissue No. 14,914.

Figure 3:
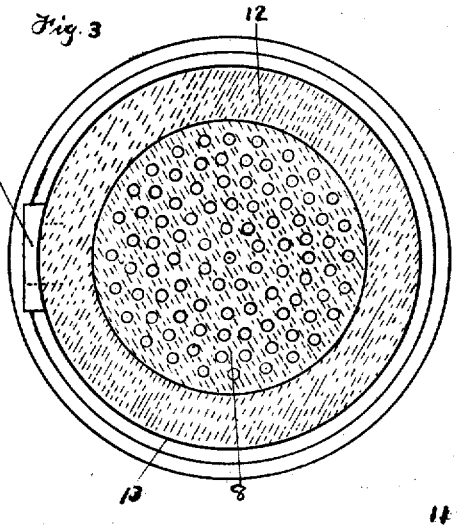

It is hereby certified that in Letters Patent Reissue No. 14,914, granted July 13, 1920, upon the application of Samuel M. Howell, of Zanesville, Ohio, for an improvement in "Metallurgical Furnaces," an error appears requiring correction as follows: In the drawings for "Fig. 3" read *Fig. 2;* and that the said Letters Patent should be read with this correction therein that the same may conform to the record of the case in the Patent Office.

Signed and sealed this 30th day of November, A. D., 1920.

[SEAL.] L. B. MANN,

*Acting Commissioner of Patents.*

Cl. 158—7.